United States Patent
Kobayashi et al.

(10) Patent No.: US 12,280,730 B2
(45) Date of Patent: Apr. 22, 2025

(54) SIDE AIRBAG DEVICE AND METHOD FOR MANUFACTURING THE SAME

(71) Applicant: Autoliv Development AB, Vargarda (SE)

(72) Inventors: Yuto Kobayashi, Kanagawa (JP); Takaki Shibuya, Kanagawa (JP)

(73) Assignee: Autoliv Development AB, Vargarda (SE)

(*) Notice: Subject to any disclaimer, the term of this patent is extended or adjusted under 35 U.S.C. 154(b) by 0 days.

(21) Appl. No.: 18/552,382

(22) PCT Filed: Feb. 2, 2022

(86) PCT No.: PCT/JP2022/003973
§ 371 (c)(1),
(2) Date: Sep. 25, 2023

(87) PCT Pub. No.: WO2022/209259
PCT Pub. Date: Oct. 6, 2022

(65) Prior Publication Data
US 2024/0157905 A1 May 16, 2024

(30) Foreign Application Priority Data
Mar. 31, 2021 (JP) .............................. 2021-062021

(51) Int. Cl.
*B60R 21/207* (2006.01)
*B60R 21/231* (2011.01)
*B60R 21/237* (2006.01)

(52) U.S. Cl.
CPC ...... *B60R 21/207* (2013.01); *B60R 21/23138* (2013.01); *B60R 21/237* (2013.01); *B60R 2021/23146* (2013.01)

(58) Field of Classification Search
CPC ............ B60R 21/207; B60R 21/23138; B60R 2021/23146; B60R 21/237; B60R 21/233; B60R 2021/23308; B60R 2021/23324
See application file for complete search history.

(56) References Cited

U.S. PATENT DOCUMENTS

| | | | |
|---|---|---|---|
| 2012/0068443 A1* | 3/2012 | Berntsson | B60R 21/237 280/730.2 |
| 2015/0091281 A1* | 4/2015 | Nagasawa | B60R 21/2338 280/730.1 |

(Continued)

FOREIGN PATENT DOCUMENTS

| | | | | |
|---|---|---|---|---|
| EP | 1122134 A1 * | 8/2001 | ........... | B60R 21/201 |
| JP | 09150705 A * | 6/1997 | ......... | B60R 21/0428 |

(Continued)

OTHER PUBLICATIONS

Kobayashi, Side Airbag Device and Vehicle Seat Provided Therewith, Dec. 26, 2019, EPO, WO 2019244493 A1, Machine Translation of Description (Year: 2019).*

*Primary Examiner* — Paul N Dickson
*Assistant Examiner* — Matthew D Lee
(74) *Attorney, Agent, or Firm* — Harness, Dickey & Pierce, P.L.C.; Stephen T. Olson

(57) ABSTRACT

A side airbag device stowed in a side part of a vehicle seat and includes: an airbag for restraining an occupant by expanding and deploying; and an inflator provided in a side wall part of a seat frame in the vehicle width direction extending in the vehicle traveling direction when a horizontal cross section of the vehicle seat is viewed from above, and that supplies expansion gas to the airbag. The airbag includes a main chamber that expands and deploys towards the front and a pre-push chamber that expands and deploys before the main chamber to the inside of the main chamber in the vehicle width direction. Furthermore, the pre-push (Continued)

chamber has a structure with an extension portion extending from the inflator towards the rear of the vehicle seat.

13 Claims, 13 Drawing Sheets

(56) References Cited

U.S. PATENT DOCUMENTS

| | | | |
|---|---|---|---|
| 2015/0158453 A1* | 6/2015 | Fujiwara | B60R 21/23138 280/730.2 |
| 2016/0096504 A1* | 4/2016 | Fujiwara | B60R 21/237 280/729 |
| 2017/0113645 A1* | 4/2017 | Hayashi | B60R 21/237 |
| 2021/0291777 A1* | 9/2021 | Shimono | B60R 21/207 |
| 2024/0075899 A1* | 3/2024 | Kobayashi | B60R 21/23138 |

FOREIGN PATENT DOCUMENTS

| | | | | |
|---|---|---|---|---|
| JP | 2009-023494 A | | 2/2009 | |
| JP | 2017-206054 A | | 11/2017 | |
| JP | 2019137100 A | * | 8/2019 | ........... B60R 21/207 |
| WO | 2018/105324 A1 | | 6/2018 | |
| WO | WO-2019244493 A1 | * | 12/2019 | ........... B60R 21/207 |
| WO | 2020/071099 A1 | | 4/2020 | |
| WO | 2020/129386 A1 | | 6/2020 | |

* cited by examiner

A1-A1 CROSS SECTION

Front ←→ Back

AII—AII CROSS SECTION

SIDE AIRBAG DEVICE AND METHOD FOR MANUFACTURING THE SAME

TECHNICAL FIELD

The present invention relates to a side airbag device stowed in the side of a vehicle seat as well as a manufacturing method thereof.

BACKGROUND TECHNOLOGY

Providing a vehicle with one or a plurality of airbag devices in order to protect an occupant therein in the event of a vehicle accident is well known. There are various forms of airbag devices, such as so-called driver airbag devices that deploy from near the center of a steering wheel to protect a driver, curtain airbags that deploy downward inside a window to protect an occupant in the event of a lateral impact, rollover, or overturning accident, side airbag devices that are deployed to a side of an occupant (side of a seat) to protect the occupant in the event of a lateral impact of the vehicle, and the like. The present invention relates to a side airbag device provided in a vehicle seat and a manufacturing method of the side airbag device.

The side airbag device described in the following Patent Document 1 includes a primary airbag and an auxiliary airbag. Furthermore, the auxiliary airbag is caused to inflate and deploy prior to the primary airbag in order to restrain an occupant early on. In addition to the invention described in Patent Document 1, a lot of side airbag devices that include an auxiliary airbag have been proposed.

However, with a conventional side airbag device, there have been cases where prompt restraint of an occupant sitting in a seat by the auxiliary airbag was not sufficiently achieved.

PRIOR ART DOCUMENTS

Patent Documents

Patent Document 1: Japanese Unexamined Patent Application Publication No. 2009-023494

SUMMARY OF THE INVENTION

Problem to be Solved by the Invention

In light of that described above, an object of the present invention is to provide: a side airbag device capable of quickly and properly restraining an occupant; and a manufacturing method of the side airbag device.

Means for Solving the Problem

In order to achieve the object described above, a first aspect of the present invention is a side airbag device stowed in a side part of a vehicle seat and includes: an airbag for restraining an occupant by expanding and deploying; and an inflator provided in a side wall part of a seat frame in the vehicle width direction extending in the vehicle traveling direction when a horizontal cross section of the vehicle seat is viewed from above, that supplies expansion gas to the airbag. The airbag includes a main chamber that expands and deploys towards the front and a pre-push chamber that expands and deploys before the main chamber to the inside of the main chamber in the vehicle width direction. Furthermore, the pre-push chamber has a structure with an extension portion extending from the inflator towards the rear of the vehicle seat.

With the invention described above, the pre-push chamber has a structure with the extension portion that extends to the rear of the inflator and the extension portion of the pre-push chamber is sufficiently thick at the occupant side during the initial deployment stage of the airbag. In other words, while the pre-push chamber is deploying forward, the thickness of the rear portion is not reduced by momentum (pressure) to the front and as a result, the variation in thickness of the pre-push chamber is not reduced, at least for the portion in contact with the occupant, and thereby the occupant can be restrained over a broad area.

The extension portion of the pre-push chamber can be stowed in a state of being folded toward the front so as to cover a part of the inflator from the inside in the vehicle width direction.

Here, "a part of the inflator" means roughly 30% to 50% of the periphery of the inflator when, for example, viewing a cross section in the horizontal direction. With this type of configuration, the extension portion does not enter between the inflator and the seat frame and therefore does not hinder deployment, enabling smooth deployment of the extension portion.

At initial deployment of the airbag, the extension portion can be configured to have the same thickness in the vehicle width direction as the pre-push chamber when fully deployed.

The extension portion of the pre-push chamber having sufficient thickness during initial deployment of the airbag enables more rapid and reliable restraint by the pre-push chamber.

The extension portion can be configured to deploy so as to overlap with the seat frame when the deployed airbag is viewed from the side in the vehicle width direction.

Here, "overlaps with seat frame" means that the entirety of the extension portion preferably overlaps with the seat frame but is not limited to this and includes a state of a part of the extension portion to the rear protruding slightly from the rear edge part of the seat frame.

Having the extension portion of the pre-push chamber deploy in a state of overlapping with the seat frame enables deploying to the side of the occupant with use of the seat frame as a reaction surface, simplifying ensuring the thickness of the extension portion.

The extension portion of the pre-push chamber can have a structure of being formed over the entirety of the pre-push chamber in the up-down direction.

This type of structure enables fully restraining the occupant over a broad range from the shoulders to the waist.

When the airbag is in a stowed state, the main chamber can be provided in a folded or rolled state on the outside of the side wall part of the seat frame.

In addition, when the airbag is in a stowed state, the main chamber and pre-push chamber can be provided in a folded or rolled state on the inside of the side wall part of the seat frame.

A bracket for securing the inflator to the side wall part of the seat frame can further be included.

The bracket may include a long plate part extending such that the lengthwise direction thereof is a longitudinal direction, the long plate part may include a first surface facing in the vehicle traveling direction, and the main chamber may be provided in a folded or rolled state on the first surface in a stowed state.

A second aspect of the present invention is a method for manufacturing a side airbag device including an airbag stowed in a side part of a vehicle seat that restrains an occupant by expanding and deploying, the airbag including a main chamber that expands and deploys toward the front, and a pre-push chamber including an extension portion in which an inflator is stowed, that extends rearward from the inflator, and that expands and deploys to the inside of the main chamber in the vehicle width direction before the main chamber. Furthermore, the method for manufacturing includes:

- a step of folding the extension portion of the pre-push chamber towards the front so as to cover a part of the inflator;
- a step of compressing the airbag overall into a stowed state; and
- a step of securing the inflator to the side wall part of the seat frame along the vehicle traveling direction when a horizontal cross section of the vehicle seat is viewed from above.

The extension portion of the pre-push chamber can have a structure of being formed over the entirety of the pre-push chamber in the up-down direction.

When placing the airbag in a stowed state, the main chamber may be folded or rolled to the outside of the side wall part of the seat frame.

The method may further include:

- a step of preparing a bracket on the side wall part of the seat frame for securing the inflator, wherein
- the bracket includes a long plate part with the vertical direction thereof in the longitudinal direction, the long plate part including a first surface facing the vehicle traveling direction, and
- when placing the airbag in a stowed state, the main chamber is provided on this first surface in a folded or rolled state.

When placing the airbag in a stowed state, the main chamber and pre-push chamber may be folded or rolled inside the side wall part of the seat frame.

EMBODIMENTS OF THE INVENTION

The airbag device according to the present invention will be described with reference to the accompanying drawings. In the description below, when an occupant is seated in a seat in a normal posture, the direction the occupant faces is referred to as the "front," the opposite direction is referred to as the "back," and the direction indicating the coordinate axis is referred to as the "front-to-back direction." Moreover, when the passenger is seated in the seat in a regular posture, the right of the passenger is referred to as the "right direction," the left of the passenger is referred to as the "left direction," and the direction indicating the coordinate axis is referred to as the "left and right direction." Furthermore, when the occupant is seated in the seat in a regular posture, a head direction of the occupant is referred to as "up," a waist direction of the occupant is referred to as "down," and a direction indicating the coordinate axis is referred to as an "up-down direction." In addition, in the left-right direction, a region on an occupant side from a side frame of the seat shall be referred to as "inside", and a region opposite from the occupant as viewed from the side frame shall be referred to as "outside". Furthermore, "vertical direction" not only includes an exactly vertical direction, but also a slightly inclined form along the side supporting part or the seat frame.

Figure 1:
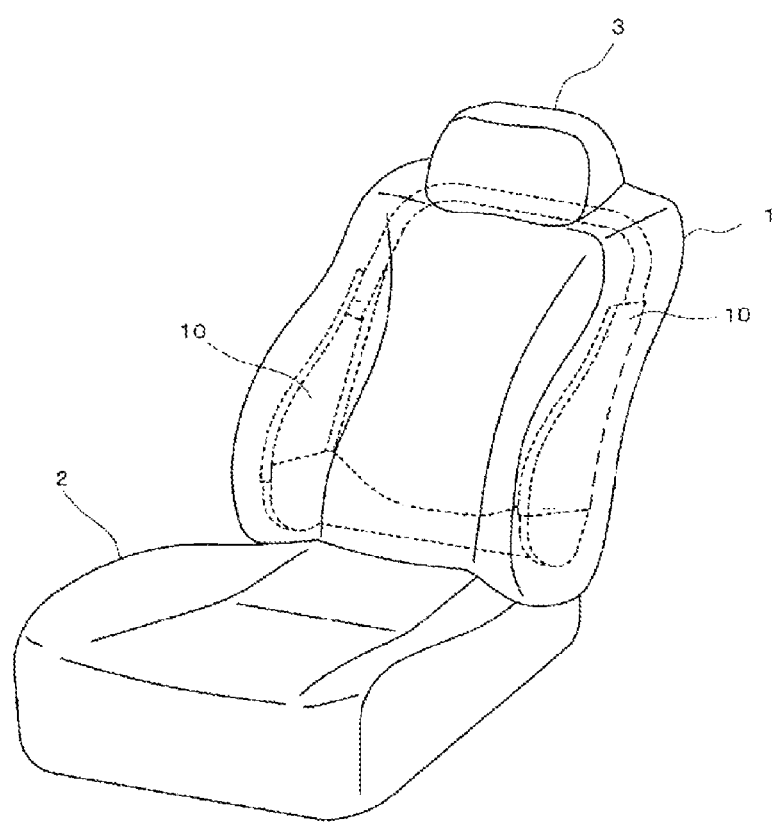
FIG. 1 is a perspective view depicting mainly the appearance form of a vehicle seat to which the side airbag device according to the present invention can be applied, and the depiction of the airbag device is omitted.
Figure 2:
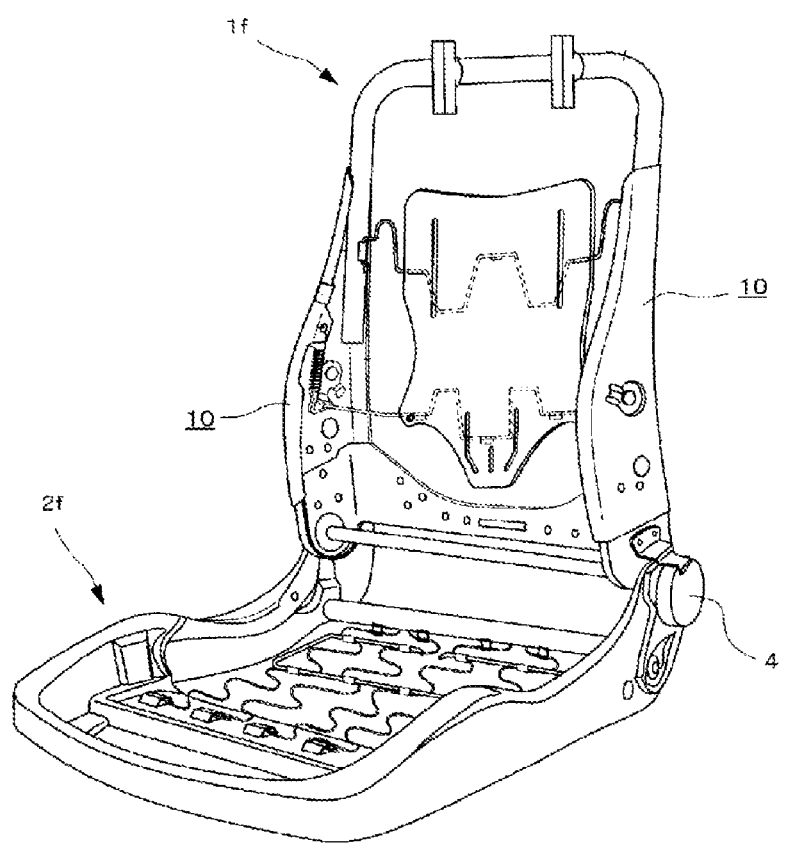
FIG. 2 is a perspective view illustrating an internal structure (seat frame) functioning as a framework of the vehicle seat illustrated in FIG. 1, with an illustration of the airbag device omitted.
Figure 3:
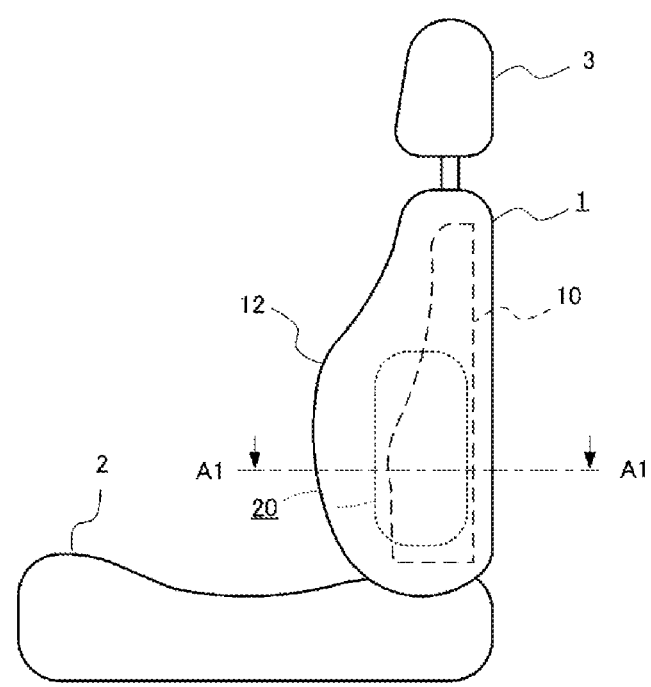
FIG. 3 is a schematic side surface view of the side airbag device according to the present invention, depicting a condition where the side airbag device is stowed therein, as viewed from the outside in the vehicle width direction.
Figure 3:
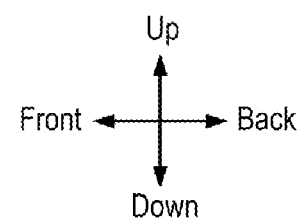

FIG. 1 is a perspective view mainly illustrating the external shape of a vehicle seat used for a passenger protection apparatus according to the present invention, with an illustration of the airbag device (20) omitted. FIG. 2 is a perspective view illustrating an internal structure (seat frame) functioning as a framework of the vehicle seat illustrated in FIG. 1, with an illustration of the airbag device (20) also omitted herein. FIG. 3 is a schematic side view of the passenger protection device according to the present invention, in addition to illustrating the state in which the airbag device 20 stowed therein on the side face (near side)

near the door of the vehicle seat is observed from the outside in the vehicle width direction.

As depicted in FIGS. 1 and 2, seen as the location, the vehicle seat to which the present invention can be applied includes: a seat cushion 2 of a part on which an occupant is seated, a seat back 1 forming a backrest, and a headrest 3 connected to the upper end of the seat back 1.

A seat back frame 1f that forms the framework of the seat is provided inside the seat back 1, a pad made of urethane foam or the like is provided on the surface and periphery thereof, and the surface of the pad is covered by a skin 14, such as leather or fabric. A seating frame 2f is provided on the bottom side of the seat cushion 2, while a pad made of a urethane foaming material, and the like is provided on the upper surface and periphery thereof, and the surface of this pad is covered with a skin 14 (FIG. 4) such as leather or fabric. The seating frame 2f and the Seatback Frame 1f are Connected Via a Reclining mechanism 4.

As illustrated in FIG. 2, the seat back frame 1f is configured into a frame shape by a seat frame 10 disposed laterally spaced apart and extending in the up-down direction, an upper frame connecting the upper end of the seat frame 10, and a lower frame connecting the lower ends thereof. The headrest 3 is configured by providing a cushioned member on an outer side of a headrest frame.

Embodiment 1

Figure 4:
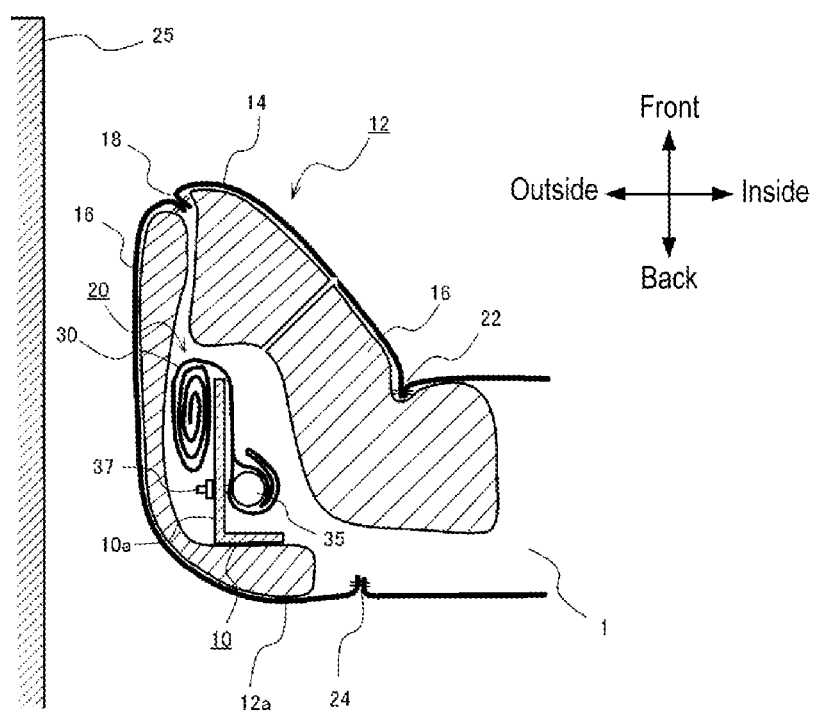
FIG. 4 is a cross sectional view depicting the structure of the vehicle seat in which the side airbag device is stowed according to Embodiment 1 of the present invention, corresponding to a cross section along the line A1-A1 of FIG. 3.
Figure 5:
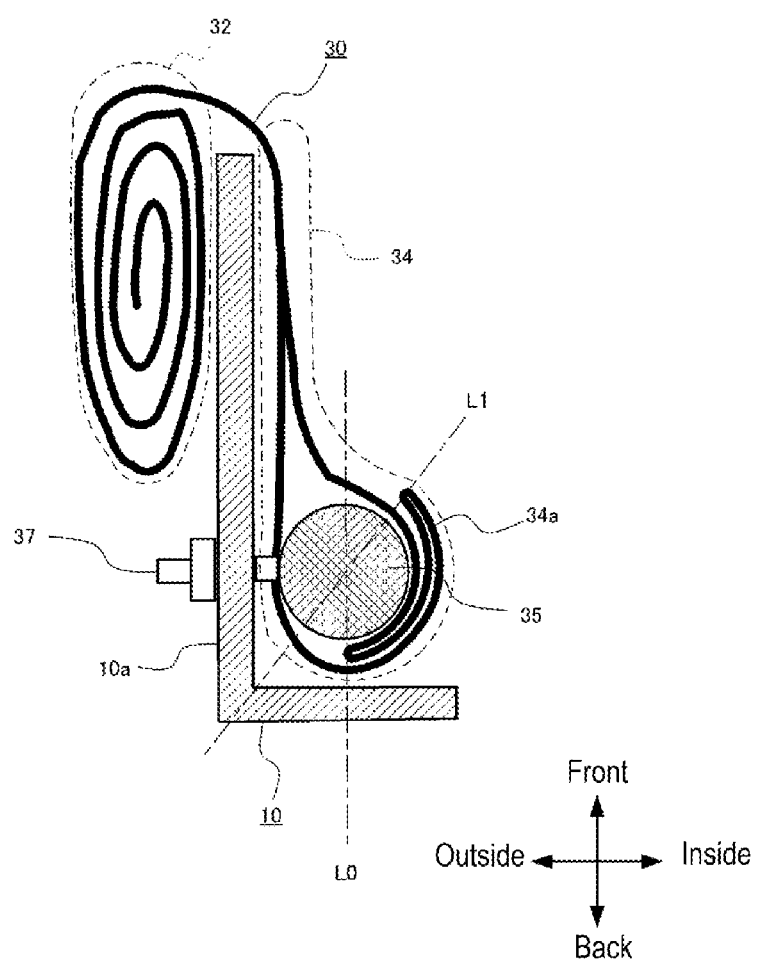
FIG. 5 is a cross section view depicting the stowed state of the side airbag device according to Embodiment 1 of the present invention.
Figure 6A:
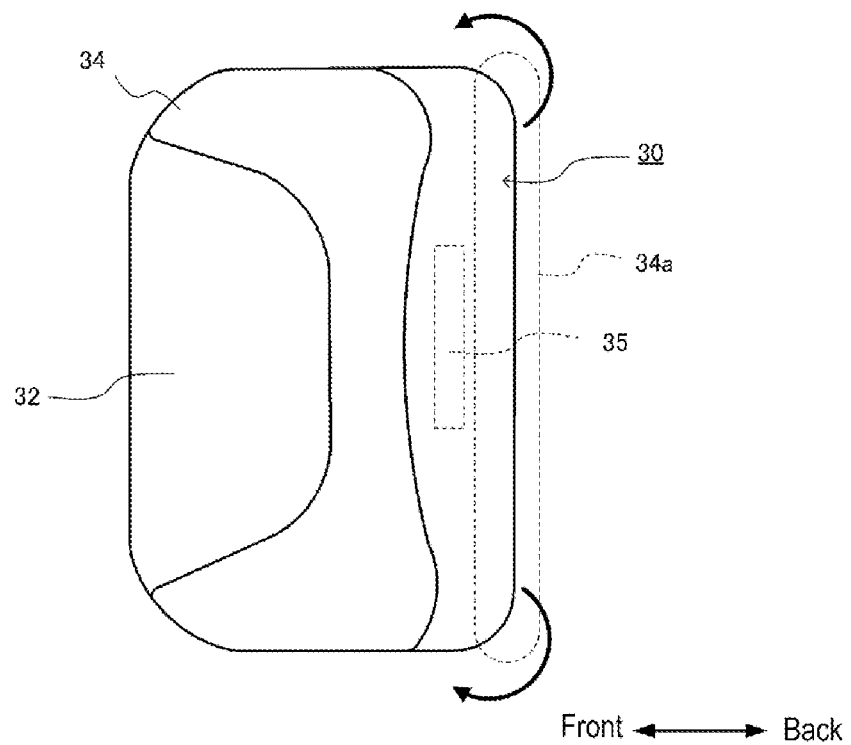
FIGS. 6(A) and 6(B) are plan views depicting a part of the folding process of the side airbag device according to Embodiment 1 of the present invention.
Figure 6B:
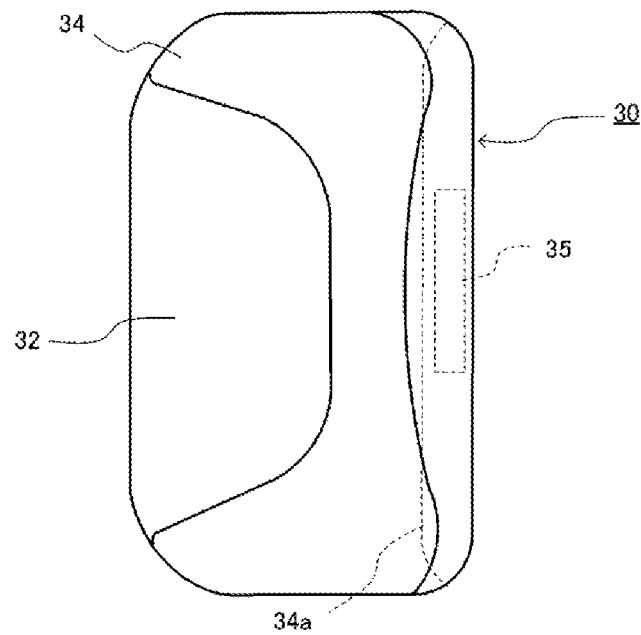
Figure 7:
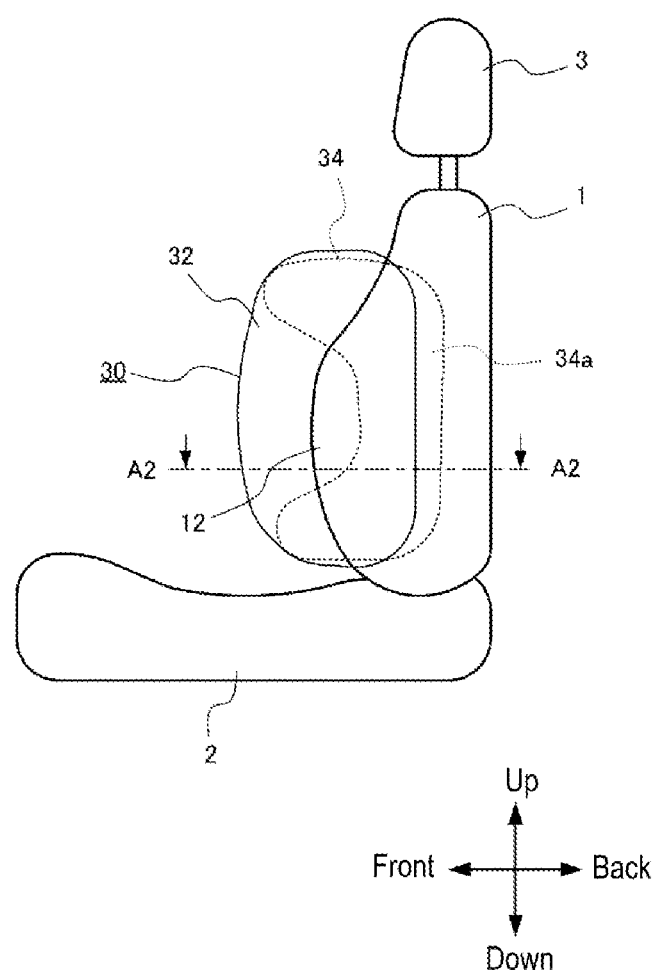
FIG. 7 is a schematic side view of a side airbag device according to Embodiment 1 of the present invention, depicting the state of a deployed airbag viewed from outside in the vehicle width direction.
Figure 8:
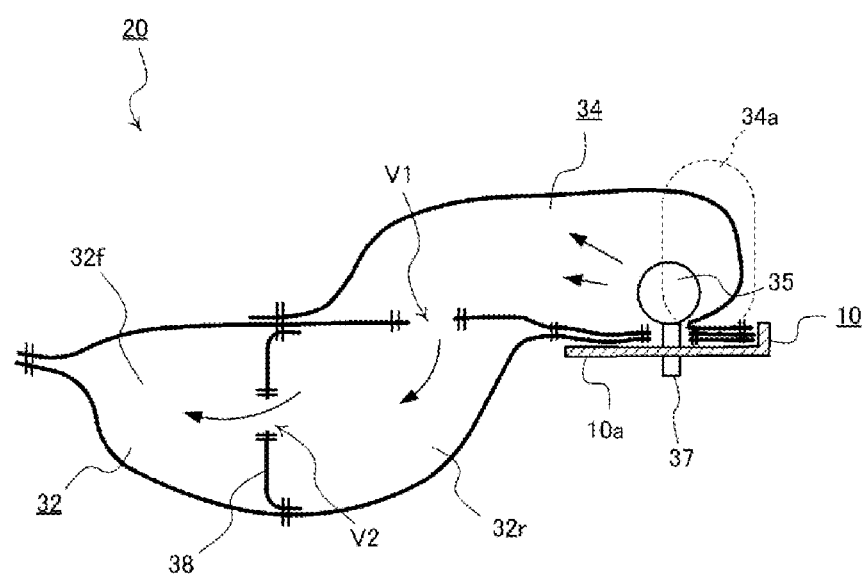
FIG. 8 is a schematic view illustrating the deployed state of the airbag, corresponding to the cross section along line A2-A2 in FIG. 7.
Figure 8:
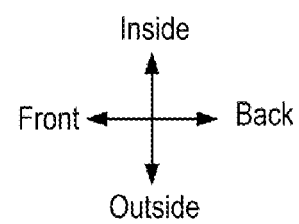
Figure 9A:
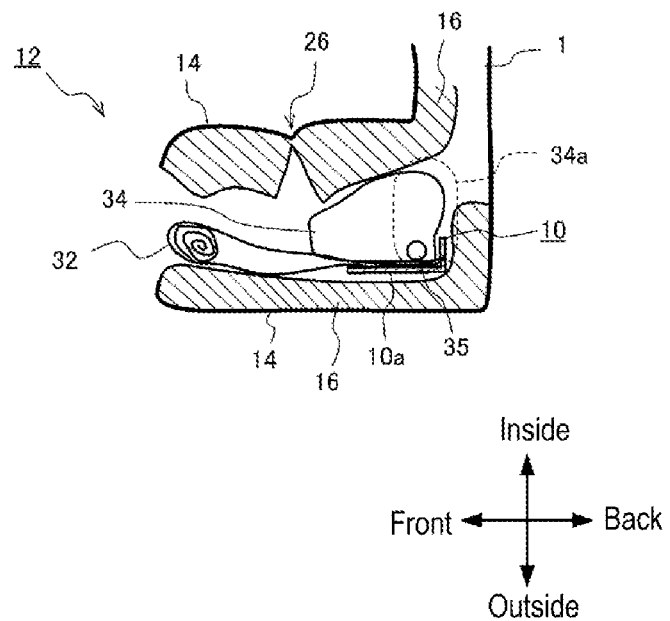
FIG. 9 is an explanatory diagram depicting a deployed state of the side airbag device according to Embodiment 1 of the present invention, where (A) depicts an early deployment condition, and (B) depicts a later deployment condition.

FIG. 4 is a cross sectional view depicting the structure of the vehicle seat in which the side airbag device 20 is stowed according to Embodiment 1 of the present invention, corresponding to a part of a cross section along the line A1-A1 of FIG. 3. FIG. 5 is a cross section view depicting a stowed state of the airbag device 20 according to Embodiment 1. FIGS. 6(A) and 6(B) are plan views depicting a part of the folding process of the airbag device 20 according to Embodiment 1. FIG. 7 is a schematic side view of a side airbag device 20 according to Embodiment 1, depicting the state of a deployed airbag 30 viewed from outside in the vehicle width direction. FIG. 8 is a schematic view illustrating the deployed state of the airbag 30, corresponding to the cross section along line A2-A2 in FIG. 7. FIG. 9 is an explanatory diagram depicting a deployed state of the airbag 30 according to Embodiment 1, where (A) depicts an early deployment condition, and (B) depicts a later deployment condition.

As depicted in FIG. 4 and FIG. 5, the seat frame 10 may be molded from a resin or a metal and have an L-shaped cross-sectional shape or a U-shaped cross-sectional shape. The seat frame 10 includes a frame sidewall part 10a that extends along the vehicle travel direction when the horizontal cross section is viewed from above.

As illustrated in FIG. 4, the seat back 1 includes a side supporting part 12 which swells in the vehicle traveling direction (vehicle front) on a vehicle width direction side part (end part). The side airbag device 20 is installed in the side supporting part 12 where there is a gap in the urethane pad 16. The side airbag device 20 is provided with airbag 30 (32, 34) that restrains an occupant by expanding and deploying, and an inflator 35 that supplies expanding gas to the airbag 30 (32, 34). The inflator 35 is secured on the inside of the side wall part 10a of the seat frame 10.

Seams 18, 22, 24 of the skin 14 of the seat back 1 are interwoven and connected by sewing. Note that the front seam 18 is cleft when the airbag 30 expands and deploys.

In addition, the side supporting part 12 is formed with a start region 26 which is the starting point for the side supporting part 12 when bending toward the occupant side due to the expansion of the pre-push chamber 34 (see FIG. 5 to FIG. 9). The start region 26 can be any one of a notch, recess, or thin region, or combinations thereof. The start region 26 may be formed at only a urethane 16 part inside the side supporting part 12. Furthermore, the start region 26 can be omitted.

The airbag 30 (32, 34) is stowed folded in a bellows shape or rolled ("folding" includes rolling), or is in an appropriate optimally compressed state. In FIG. 4, the symbol 25 denotes a door trim.

As depicted in FIG. 5 to FIG. 9, the airbag 30 (32, 34) is provided with a main chamber 32 that deploys toward the front of the side supporting part 12, and a pre-push chamber 34 that deploys to the inside of the main chamber 32 in the width direction of the vehicle.

With the airbag 30 in a stowed state, the main chamber 32 is provided in a folded or rolled state outside the side wall part of the seat frame 10.

The pre-push chamber 34 protrudes and deforms at least the front portion 14 of the side supporting part 12 toward the occupant, so that the side supporting part 12 comes into contact with and pushes on the occupant, from the waist to the shoulders.

The pre-push chamber 34 is constructed with an extension portion 34a extending rearward from the inflator 35. Furthermore, the extension portion 34a of the pre-push chamber 34 is stowed in a state of being folded toward the front so as to cover the periphery of the inflator 35 from the inside in the vehicle width direction.

As depicted in FIG. 5, for example, the extension portion 34a can cover within 30% to 50% of the entire periphery of the inflator 35, as viewed from the horizontal direction cross section. With this type of configuration, the extension portion 34a does not enter between the inflator 35 and the seat frame 10 and therefore does not hinder deployment; enabling smooth deployment of the extension portion 34a.

Note that in FIG. 5, the line L0 is a hidden line extending parallel to the seat frame 10 through the center of the inflator 35 and the line L1 is a hidden line connecting the center of the inflator 35 and the tip end part of the extension portion 34a.

As depicted in FIG. 6, the extension portion 34a of the pre-push chamber 34 can be formed across the entirety of the pre-push chamber 34 in the up-down direction. This type of configuration enables fully restraining the occupant over a broad range from the shoulders (head) to the waist.

As depicted in FIG. 6 and FIG. 7, the upper area and lower area of the pre-push chamber 34 are configured to deploy towards the front of the vehicle more-so than the center area. In other words, the pre-push chamber 34 will have a U shape or C shape with the center area to the rear, as viewed from the occupant side. When the airbag 30 is deployed, the upper area of the pre-push chamber 34 protruding to the front is positioned near the shoulders and head of the occupant enabling prompt restraining of the head, which is prone to injury. In addition, the lower region protruding to the front is positioned near the waist of the occupant and presses on the waist close to the center of gravity of the human body, thereby improving occupant restraint performance in the early stages of an accident.

The front ends of the upper area and the lower area of the pre-push chamber 34 are formed to generally match the front-end position of the main chamber 32, raising the uniformity of the airbag 30 that includes the main chamber 32 and the pre-push chamber 34 and thereby stabilizing the overall deployment shape of the airbag 30.

As depicted in FIG. 5, FIG. 8, and the like, with the present embodiment, the inflator 35 is stowed inside the pre-push chamber 34. For example, a cylinder-type inflator having a cylindrical shape may be used as the inflator 35. A pair of upper and lower stud bolts 37 protrude inside in the vehicle width direction from the periphery of the inflator 35. These stud bolts 37 are attached (fastened) to the seat frame 10 by nuts. A plurality of gas ejection holes aligned in the circumferential direction are formed in the inflator 35 and gas is ejected radially from these gas ejection holes. Further, a diffuser for controlling the flow of gas may be provided if needed.

An ECU for airbag control mounted in the vehicle is electrically connected to this inflator 35. A satellite sensor for detecting side collisions is electrically connected to this airbag control ECU. The inflator 35 can be configured to operate when the airbag control ECU detects a side collision based on a signal from this satellite sensor.

As depicted in FIG. 8, the main chamber 32 is partitioned by a partition panel 38 into a front chamber 32f and a rear chamber 32r, and an internal vent V2 is formed in the partition panel 38. In addition, an internal vent V1 is provided in the partitioning part (boundary portion) between the main chamber 32 and the pre-push chamber 34, through which expansion gas flows from the pre-push chamber 34 to the main chamber 32.

The pre-push chamber 34 is deployed to overlap with the frame sidewall part 10a as viewed from a side of the vehicle. In this case, the reaction force during pre-push chamber 34 deployment is applied to the frame sidewall part 10a causing reliable deployment towards the center side of the seat. Even after deployment, pressure from the occupant can be received by the frame sidewall part 10a, and thus the occupant can be reliably restrained in the seat center direction.

In particular, the entirety of the extension portion 34a of the pre-chamber 34 deploys so as to overlap with the seat frame 10 and so deploys toward the occupant while using the seat frame 10 as a reaction surface, simplifying ensuring thickness of the extension portion.

On the other hand, the main chamber 32 is deployed in a manner that does not overlap the frame sidewall part 10a as viewed from the side of the vehicle. This allows the main chamber 32 to be deployed quickly and smoothly without being obstructed by the seat frame 10 or the pre-push chamber 34.

In the present embodiment, the pre-push chamber 34 has a structure with the extension portion 34a that extends to the rear of the inflator 35 as depicted in FIG. 8, and the extension portion 34a of the pre-push chamber 34 is sufficiently thick at the occupant side during the initial deployment stage of the airbag 30. In other words, while the pre-push chamber 34 is deploying forward, the thickness of the rear portion is not reduced by momentum (pressure) to the front and as a result, the variation in thickness of the pre-push chamber 34 is not reduced, at least for the portion in contact with the occupant, and thereby the occupant can be restrained over a broad area.

With Embodiment 1 of the present invention having the configuration described above, as depicted in FIG. 9(A), the pre-push chamber 34 deploys inside the side supporting part 12 in an initial activation stage of the airbag device 20, deforms such that a tip end side of the side supporting part 12 bends or protrudes on the vehicle side starting from the region 26 while the seat skin 14 tears from the sewn part 18, and restrains by pushing the occupant inward in the vehicle width direction.

Figure 9B:
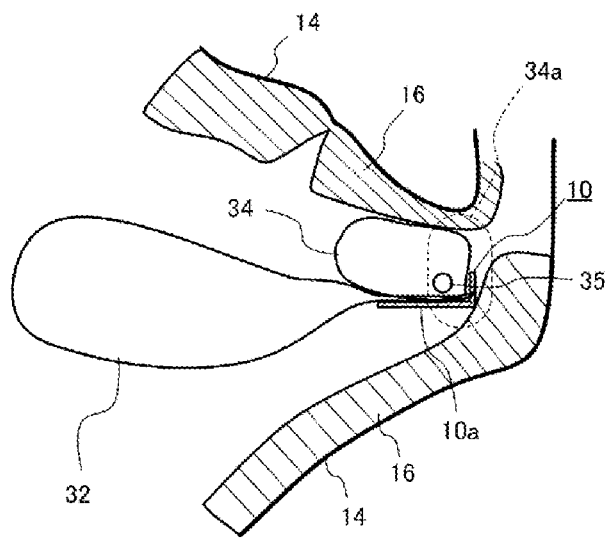

Subsequently, as depicted in FIG. 9(B), when the airbag 30 (32, 34) is further inflated, the main chamber 32 fully deploys toward the front of the vehicle to protect the occupant in the event of a collision.

Embodiment 2

Figure 10:
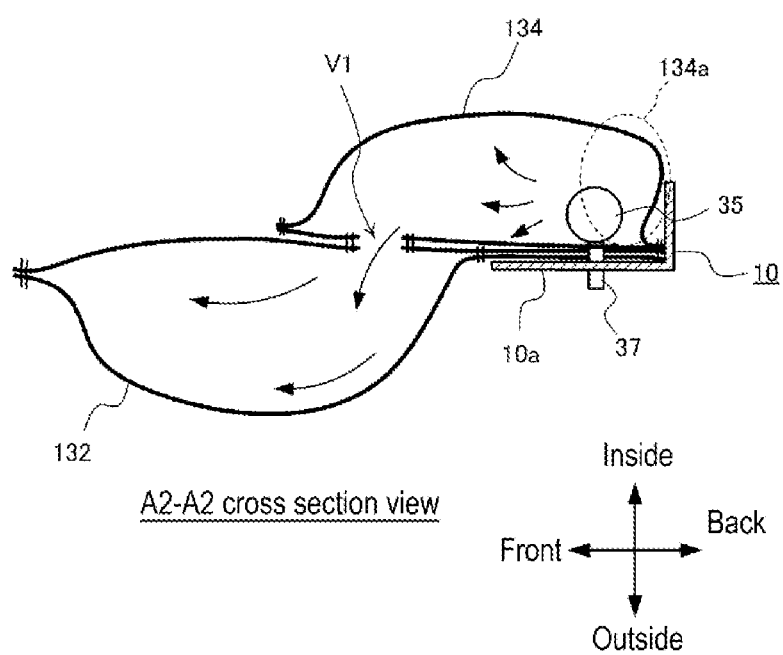
FIG. 10 is a schematic view depicting a deployed state of a side airbag according to Embodiment 2 of the present invention, corresponding to the cross section in the A2-A2 direction of FIG. 7.

FIG. 10 is a schematic view depicting a deployed state of a side airbag according to Embodiment 2 of the present invention, corresponding to the cross section in the A2-A2 direction of FIG. 7. In this embodiment, the main chamber 132 is configured as a single chamber and is not provided with a partition panel in the middle as in Embodiment 1. The structure of a pre-push chamber 134 is roughly the same as in Embodiment 1.

Embodiment 3

Figure 11:
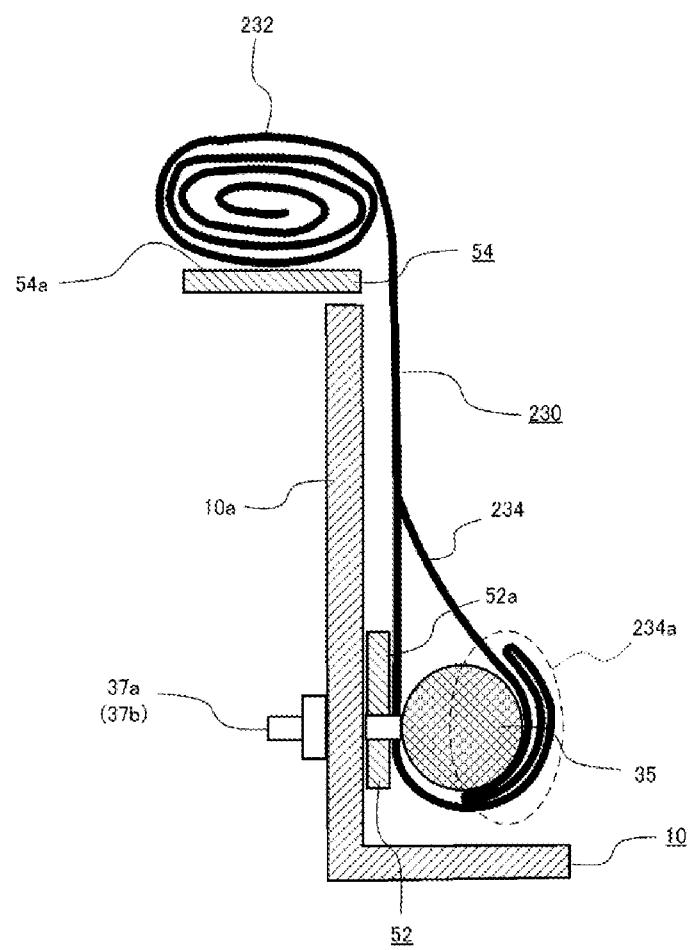
FIG. 11 is a cross section view depicting the stowed state of the side airbag device according to Embodiment 3 of the present invention.
Figure 11:
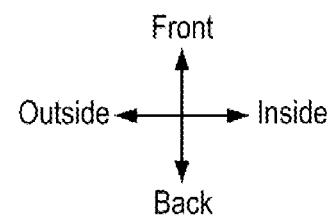
Figure 12:
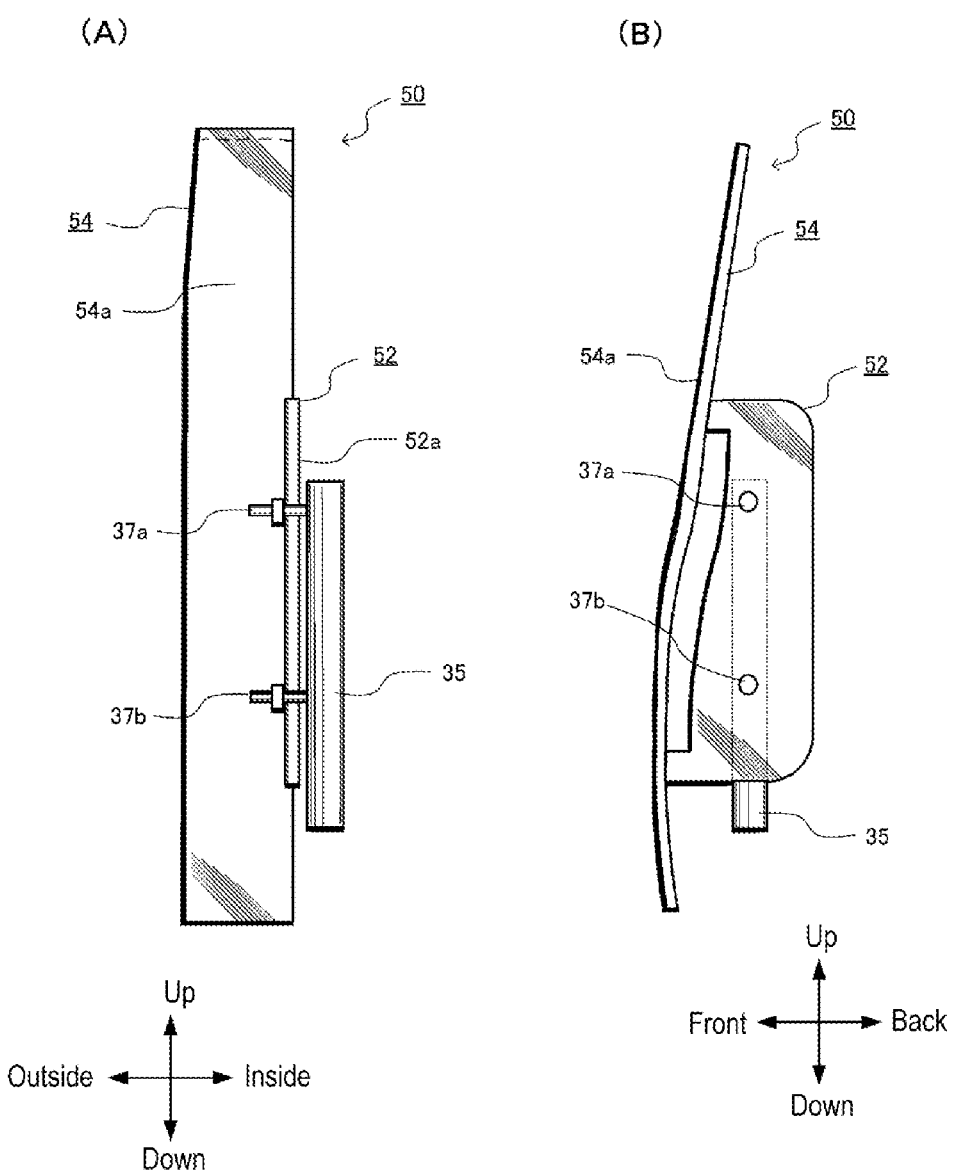
FIG. 12 is a rear view (A) and a side view (B) of the structure of a bracket employed in the airbag device according to Embodiment 3 of the present invention. Note that the rear view (A) illustrates a view observed from the rear of the vehicle, and the side view (B) illustrates a view observed from the outer side of the vehicle seat (opposite side of the occupant).

FIG. 11 is a cross section view depicting the stowed state of the side airbag device according to Embodiment 3 of the present invention. FIG. 12 is a rear view (A) and a side view (B) of the structure of a bracket 50 (52, 54) employed in the airbag device according to Embodiment 3 of the present invention. The rear view (A) illustrates a view observed from the rear of the vehicle, and the side view (B) illustrates a view observed from the outer side of the vehicle seat (opposite side of the occupant). In FIG. 12, for the purpose of clarifying the shape and arrangement of the bracket 50 (52, 54) the airbag 30 is omitted and only the inflator 35 is depicted.

In the present embodiment, the side wall part 10a of the seat frame 10 is provided with the bracket 50 (52, 54) for securing the inflator 35.

The bracket 50 (52, 54) is provided with a first plate 54 that is a flat plate shape extending in the vertical direction and a second plate 52, through which two stud bolts 37a, 37b connected to the inflator 35 penetrate, and is secured directly to the seat frame 10. This type of bracket 50 is, in general, provided such that the first plate 54 and second plate 52 are orthogonal when viewed in a cross section perpendicular to the longitudinal direction (see FIG. 11), and the first plate 54 and the second plate 52 are connected to each other by welding or the like.

The first plate 54 of the bracket includes a first surface 54a facing the vehicle traveling direction and a main chamber 232 of an airbag 230 in a stowed state is provided on the first surface 54a in a rolled state. At this time, when the compressed airbag 230 (232) expands and deploys in the vehicle traveling direction, the first surface 54a of the first plate 54 is a reaction force surface, and thus the airbag 230 (232) reliably and quickly deploys in a forward direction.

On the other hand, the second plate 52 of the bracket has a second surface 52a facing the occupant side, and mainly a pre-push chamber 234 of the airbag 230 is provided on the second surface 52a. When the pre-push chamber 234 is deployed, the second surface 52a of the second plate 52 becomes a reaction force surface, causing the pre-push chamber 234 to deploy reliably and quickly in the direction of the occupant (inner side).

Similar to Embodiment 1, the pre-push chamber 234 is constructed with an extension portion 234a extending rearward from the inflator 35. Furthermore, the extension portion 234a of the pre-push chamber 234 is stowed in a state of being folded toward the front so as to cover the inside of the periphery of the inflator 35.

Embodiment 4

Figure 13:
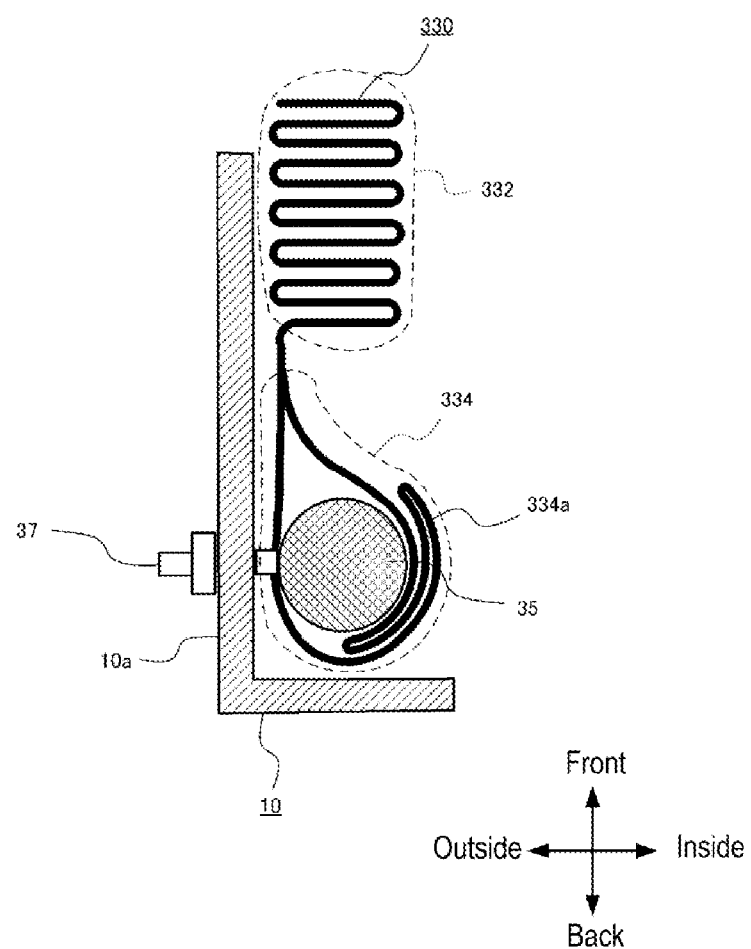
FIG. 13 is a cross section view depicting the stowed state of the side airbag device according to Embodiment 4 of the present invention.

FIG. 13 is a cross section view depicting the stowed state of the side airbag device according to Embodiment 4 of the present invention. When the present embodiment is compared to Embodiment 1 (FIG. 5), the stowing position of a main chamber 332 is different. With the present embodiment, the main chamber 332 is provided inside the seat frame 10 (occupant side). In other words, the entire airbag module is structured so as to be provided inside the seat frame 10.

The main chamber 332 is stowed in a folded bellows shape, but can also be compressed into a roll shape.

With the present embodiment, similar to other embodiments, a pre-push chamber 334 is constructed with an extension portion 334a extending rearward from the inflator 35. Furthermore, the extension portion 334a of the pre-push chamber 334 is stowed in a state of being folded toward the front so as to cover the inside of the periphery of the inflator 35.

While the present invention has been described with reference to the abovementioned illustrative embodiments, many equivalent changes and variations will be obvious to those skilled in the art from the present disclosure. Therefore, the abovementioned illustrative embodiments of the present invention are presumably illustrative and not limiting. Without departing from the spirit and scope of the present invention, the described embodiments may take on various modifications. For example, while a side airbag on the near side has been predominantly mentioned in the Description of the Preferred Embodiment, use is also possible with a far side airbag (surface on the far side from a vehicle door of a vehicle seat), in very small vehicles such as a single seat vehicle (irrespective of the presence of a door, a vehicle including parts with only one seat in a single row), and the like.

The invention claimed is:

1. A side airbag device for stowage in a side part of a vehicle seat, the side airbag device comprising:
    an airbag for restraining an occupant by expanding and deploying; and
    an inflator provided in a side wall part of a seat frame in a vehicle width direction extending in a vehicle traveling direction when a horizontal cross section of the vehicle seat is viewed from above, that supplies expansion gas to the airbag; wherein
    the airbag includes a main chamber that expands and deploys towards a front and a pre-push chamber that expands and deploys before the main chamber to an inside of the main chamber in the vehicle width direction, and
    the pre-push chamber includes an extension portion that extends rearward from the inflator toward a rear of the vehicle seat,
    wherein the extension portion of the pre-push chamber is stowed in a state folded towards the front so as to cover a portion of the inflator from the inside in the vehicle width direction.

2. The side airbag device according to claim 1, wherein at initial deployment of the airbag, the extension portion has a same thickness in the vehicle width direction as the pre-push chamber when fully deployed.

3. The side airbag device according to claim 1, wherein when the airbag is viewed from a side in the vehicle width direction upon deployment, the extension portion deploys so as to overlap with the seat frame.

4. The side airbag device according to claim 1, wherein the extension portion of the pre-push chamber is formed over an entirety of the pre-push chamber in an up-down direction.

5. The side airbag device according to claim 1, wherein with the airbag in a stowed state, the main chamber is provided in a folded or rolled state to an outside of the side wall part of the seat frame.

6. The side airbag device according to claim 1, wherein with the airbag in a stowed state, the main chamber and pre-push chamber are provided in a folded or rolled state to an inside of the side wall part of the seat frame.

7. The side airbag device according to claim 1, further comprising a bracket on the side wall part of the seat frame for securing the inflator.

8. A side airbag device for stowage in a side part of a vehicle seat, the side airbag device comprising:
    an airbag for restraining an occupant by expanding and deploying;
    an inflator provided in a side wall part of a seat frame in a vehicle width direction extending in a vehicle traveling direction when a horizontal cross section of the vehicle seat is viewed from above, that supplies expansion gas to the airbag; and
    a bracket on the side wall part of the seat frame for securing the inflator,
    wherein the airbag includes a main chamber that expands and deploys towards a front and a pre-push chamber that expands and deploys before the main chamber to an inside of the main chamber in the vehicle width direction,
    wherein the pre-push chamber includes an extension portion that extends rearward from the inflator toward a rear of the vehicle seat, and
    wherein:
    the bracket includes a long plate part extending such that a lengthwise direction thereof is a longitudinal direction,
    the long plate part includes a first surface facing in the vehicle traveling direction, and
    the main chamber is provided in a folded or rolled state on the first surface in a stowed state.

9. A method for manufacturing a side airbag device including an airbag stowed in a side part of a vehicle seat for restraining an occupant by expanding and deploying, the airbag including a main chamber that expands and deploys toward the front, and a pre-push chamber including an extension portion in which an inflator is stowed, that extends rearward from the inflator, and that expands and deploys to an inside of the main chamber in the vehicle width direction before the main chamber,
    the method for manufacturing comprising:
    a step of the extension portion of the pre-push chamber being folded towards the front so as to cover a part of the inflator;
    a step of compressing the airbag overall to a stowed state; and
    a step of securing the inflator inside a side wall part of a seat frame extending in the vehicle traveling direction when viewing a horizontal cross section of the vehicle seat from above.

10. The method for manufacturing a side airbag device according to claim 9, wherein the extension portion of the pre-push chamber is formed along an entirety of the pre-push chamber in an up-down direction.

11. The method for manufacturing a side airbag device according to claim 9, wherein when placing the airbag in a stowed state, the main chamber is folded or rolled to an outside of the side wall part of the seat frame.

12. The method for manufacturing a side airbag device according to claim 9, further comprising:

a step of preparing a bracket on the side wall part of the seat frame for securing the inflator; wherein the bracket includes a long plate part with a vertical direction thereof in a longitudinal direction, the long plate part including a first surface facing the vehicle traveling direction, and when placing the airbag in a stowed state, the main chamber is provided on the first surface in a folded or rolled state.

13. The method for manufacturing a side airbag device according to claim 9, wherein when placing the airbag in a stowed state, the main chamber and the pre-push chamber are folded or rolled inside the side wall part of the seat frame.

* * * * *